Patented June 10, 1941

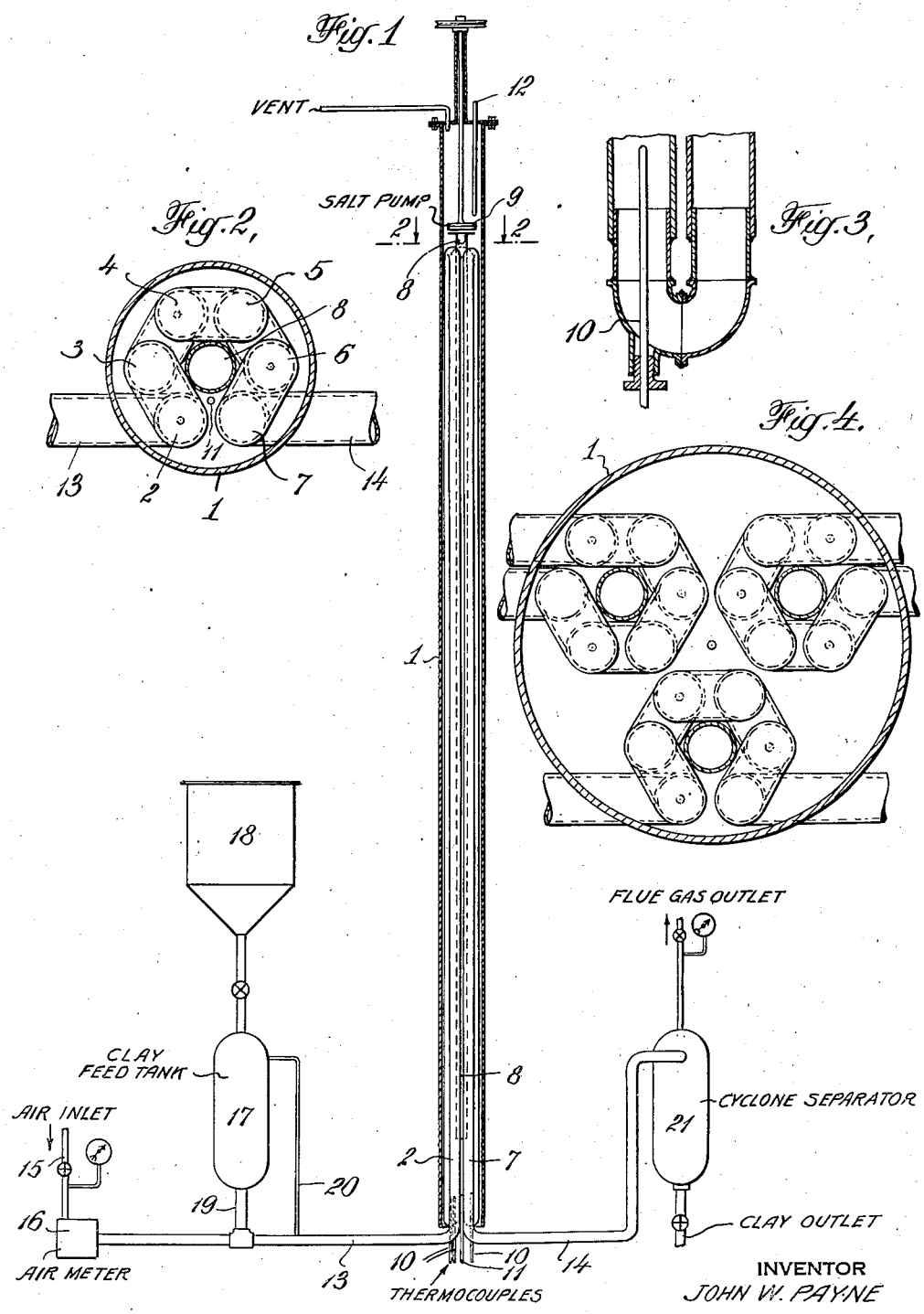

2,245,531

UNITED STATES PATENT OFFICE 2,245,531

PROCESS FOR TREATING FINELY DIVIDED SOLID MATERIALS

John W. Payne, Woodbury, N. J., assignor to Socony-Vacuum Oil Company, Incorporated, New York, N. Y., a corporation of New York Application April 29, 1939, Serial No. 270,943

9 Claims. (Cl. 252—281)

This invention relates to a process for treating finely divided solid materials under closely controlled temperature conditions while carried in gaseous suspension. The invention particularly relates to a process for regenerating spent adsorbent materials such as clays, bauxite, bone-char and the like. The present process is especially adapted for the regeneration of percolation and contact clays used in the refining of petroleum products.

Porous adsorbent materials are used widely in many industries for refining of various products—for example, in the filtration of mineral or vegetable oils, sugar liquors, etc.—and regeneration is effected by burning of the organic materials deposited on the adsorbent material. Moreover, certain adsorbent materials are used in catalytic processes of chemical conversion, e. g., catalytic cracking of petroleum hydrocarbons, wherein the adsorbent material constitutes the catalyst or acts as a carrier therefor or as a portion thereof, the spent adsorbent being contaminated with carbonaceous material during cracking and regenerated by burning. Materials of this type which are subjected to similar regeneration processes are common and well known in the art. For convenience the present process will be described in detail with respect to regeneration of filter clays; however, it is to be understood the invention is not limited thereto but is directed to the whole field of regeneration of finely divided contact materials by burning off of impurities, as well as to the initial preparation of same when necessary, including drying, hardening and the like, by application of heat. Likewise, the present process may be used with advantage for the heat treatment of finely divided solids in general with or without gases or vapors as, for instance, the roasting of ores, certain catalytic processes, etc., the process being particularly advantageous for treatments wherein close temperature control is a necessity and reactions are involved which produce or consume a considerable amount of heat.

In regeneration of filter clays as carried out today, the clay suffers a loss in efficiency with each burning or regeneration until finally it cannot be regenerated to a sufficiently high activity to warrant regeneration, at which time the clay is discarded to waste. Clays which have had a different number of burnings have different efficiencies and therefore are kept separate and separately classified. In general petroleum filter clays are only regenerated about seven or eight times and practically never more than ten or fifteen times before they must be thrown away.

The problem of regenerating clays is complicated by the sensitivity of the clays to high temperatures. While usually temperatures around 900°–1150° F. are desired for burning off impurities from the clay, temperatures around 1300° F. may permanently injure the clay. Moreover, if the temperature falls too low, inefficient regeneration results. The problem of keeping the temperature of the clay within safe limits is greatly increased since the combustion reaction involved in burning off the impurities evolves considerable amounts of heat and can very easily become so rapid as to get beyond control temporarily, either generally or locally. Probably one of the principal reasons for the successive losses in activity of regenerated clay is the fact a certain amount is overheated or underheated each treatment. In view of the fact most clays to be regenerated have more than enough carbonaceous material deposited thereon to furnish the heat required for regenerating, it is quite probable that in the regenerating processes now in general use overheating is permitted; this appears to be true, moreover, from the fact it would be extremely difficult to control precisely the temperature of all the clay in such processes.

In the past various methods have been devised for carrying out the regeneration of spent clay. One of the first comprised merely spreading the spent clay upon an open hearth and burning it. Today there are three principal methods of regenerating spent clay in general use. In the first method the clay falls or cascades over baffles set at about a 45° angle through a flue countercurrent to gases of combustion. In the second method the clay is regenerated in a rotary kiln slightly inclined from the horizontal. In the third method, which probably is the most commonly used, multiple hearth burners are employed. These multiple hearth furnaces or burners are substantially the same as used in the roasting of ore and are of either the Nichols-Herreshoff or Wedge type. In these burners the clay is slowly rabbled across each hearth, dropping from one to another until the bottom hearth is reached. In all of these commonly used methods the temperature is controlled principally by regulating the fires, steam, water, clay rate and the concentration of oxygen passed into the burner and therefore the rate of oxidation.

The kilns or burners which are now in common use are relatively inefficient because of absence of proper temperature control for preventing overburning of clays, comparatively small throughput per unit volume of burner, and inefficient utilization of the heat developed in burning the oil or other carbonaceous matter left on the clay, thus requiring considerable quantities of additional fuel to complete combustion.

Other methods have been proposed but have not displaced the three above-described to any appreciable extent. This very fact that other burners have not been taken up by the art is believed conclusive that the operation of each one suggested is subject to limitations which prevent regenerations as efficient as, or at least any more efficient than, those already enjoyed by the art. While such a fact is not usually so conclusive, it is believed to be in the present case in view of the tremendous amounts of clay used and thrown away each year and the increased amount that is necessary because of the successive loss in efficiency. Moreover, in view of the fact that clays and like materials are not used in just one industry but in many, with a universal desire existing for improvement, it is believed impossible that any method which effected any substantial improvement over those now employed could go unnoticed and undeveloped. This view can well be appreciated when it is realized that a single average size lube oil refinery in the petroleum industry alone regenerates over 75,000 tons of clay each year.

In order to set forth fully the prior art that existed when the present invention was made, it might be well to mention one or two of these other methods which have been proposed and to point out wherein each would fail to give the improved results that may be obtained with my invention.

In one such prior proposal the clay was dropped through a vertical flue countercurrent to combustible gas, and the outside of the flue was heated by direct flames and combustion gases from a burner at the base of the flue. Various other proposals employ flames and combustion gases to heat the clay indirectly. It should be noted that uneven and non-uniform heating of the clay results when such prior proposals are employed, since the bottom of the flue where the flames first contact same would be of higher temperature than near the top of the flue. More important, however, is the fact that such methods do not afford substantially constant temperatures, maintaining all the clay that passes therethrough within the optimum range and without the deleterious range. Such methods would not permit quick adjustment for large and rapid temperature fluctuations. For instance, if the amount of heat evolved from the exothermic oxidation of the impurities became too high, this could only be combatted by reducing the amount of oxygen to the flue and shutting off the indirect heating flames and allowing the material gradually to cool down, by which time a portion of the clay in all probability would have been permanently injured by being subjected to a too high temperature.

Probably with a view to eliminating some of the above difficulties, it has been proposed to blow an air-clay combustion mixture through electrically heated tubes. Means for controlling the temperature to a certain extent is also provided by passing the mixture from the electrically heated tube through a preheating tube wherein it is in indirect heat exchange with the cool air-clay mixture, being passed to the electrically heated tube. In such a proposal there would be lags as a consequence of the electrical heating to prevent quick adjustment of temperature conditions and, as in the above-mentioned flame-heated flues, overheating in the electrically heated tube itself could only be compensated for by turning off the heat and permitting gradual cooling, by which time damage to the clay would probably have resulted. Moreover, even if overheating has not occurred by the time the clay reaches the preheater tube, at which time rapid oxidation would be occurring, such preheating means would not seem to afford adequate means to offset any rapid rise in temperature. In the first place, most regenerations must be balanced to a certain degree as to air and clay ratio, and in order to obtain efficient burning the throughput of clay cannot exceed certain values. Hence, if it were attempted to increase the amount of cooling by passing more cool air-clay mixture through the preheater, this might well upset the working balance or operations, since this cool air-clay mixture is charged from the preheater into the burner tube. Furthermore, even if this did not happen, the result would be that increased amounts of air and clay would be charged to the burner, which would produce more heat, and it might well be that any attempt to cool the clay would actually result in heating it more, or at least in not decreasing the temperature.

As a result of my research I have striven to devise a method which would be commercially feasible for handling large quantities of clay and would permit burning off of impurities from the clay at optimum temperatures while at the same time affording such constant uniform heating of all the clay under such closely controllable temperature conditions that substantially none of the clay would be subjected to a deleterious temperature. It is believed the improved results I obtain with my present invention are largely due to the fact that my invention permits burning of clay under substantially these conditions.

It is an object of my invention to provide a process for the heat treatment of finely divided solids which permits a close uniform temperature control over all the solids.

Another object is to provide a process for subjecting a moving stream of finely divided solid material to the action of gases or vapors traveling concurrently therewith while maintaining a uniform temperature control over all the solids in said stream.

A more specific object of the invention is to provide a process for subjecting porous adsorptive materials to a heat treatment wherein the adsorptive material is carried through a treating zone suspended in a gaseous medium traveling concurrently therewith and a uniform temperature control is maintained over all the adsorptive material passing through the zone.

Still another specific object of the invention is to provide a process for regenerating spent adsorptive material such as clay and the like having carbonaceous impurities deposited thereon by reacting said carbonaceous impurities with a gaseous oxidizing medium which permits the adsorptive material to be passed through a reacting zone suspended in the gaseous medium and traveling concurrently therewith and providing means for controlling the temperature of all the adsorptive material such that efficient regeneration will be effected without subjecting the material to deleterious temperatures.

A further object is the provision of a process which accomplishes the above objects permitting a more efficient utilization of the heat developed during the process than is attainable in the methods now enjoyed by the art.

Still another specific object of my invention is the provision of a process for accomplishing the above object and which permits the use of an efficient heat transfer medium that is maintained at substantially the temperature of the treatment being controlled.

The above and other objects will appear from the following description of my invention.

The present invention comprises passing finely divided solids concurrently with and carried in suspension by a gaseous agent which is in intimate contact therewith through a treating zone wherein a liquid heat exchange medium is maintained within sufficiently close proximity to each of the solids in said zone that a close uniform treatment thereof may be effected at suitable elevated treating temperatures without any deleterious temperatures being established at any point in said zone.

An important feature of the present invention is the use of a liquid heat exchange medium in the treating zone for controlling the temperature and the maintaining of this liquid heat exchange medium throughout substantially the entire treating zone in indirect heat exchange with but within sufficiently close proximity to each particle in said zone that substantially no deleterious temperature conditions are created.

The liquid heat exchange medium to be used is preferably one which at the temperatures encountered, usually temperatures roughly from 500° to 1600° F., is possessed of a low vapor pressure, a high specific heat, a suitable viscosity and is not corrosive to the usual metals and other materials which may be used in construction of the apparatus. Many normally solid materials in their fused state form excellent heat exchange mediums such as fused salts and fused metals and alloys. In the regeneration of clay, I prefer the use of fused salts. A particularly preferable mixture of this kind is a mixture of the alkali-metal salts of nitric and nitrous acids. By the use of liquid heat exchange media and by having them in sufficiently close proximity to all particles undergoing reaction an extremely close and uniform temperature control may be maintained.

In the preferred practice the heat exchange medium is maintained at substantially the temperature of the treatment being controlled. Such practice may be carried out because the heat exchange medium is a liquid and has a relatively high specific heat and the heat exchange medium is brought within close proximity to every granule being treated. Hence considerable fluctuations in temperature in either direction can be compensated by the liquid heat exchange medium without substantially altering its temperature; and if the fluctuation is too great, suitable cooling or heating of the heat exchange medium in its circuit will still maintain the liquid at the treating temperature. Thus if a sharp brief rise in temperature occurs which normally would damage the clay before it is indicated, if ever, on a temperature responsive device and suitable manipulation effected to offset the rise, in the present method the liquid heat exchange medium would immediately and automatically offset the rise by absorbing any excess heat so that deleterious temperatures would not be created. Likewise, if the temperature fell off sharply so that normally the temperature would go so low that inefficient regeneration would result, this fluctuation likewise would be immediately and automatically offset by the liquid heat exchange medium, which would add heat to the cooling granules. Still further, in operations where the clay flows through the apparatus, more heat is evolved near the start than near the end of the regeneration when most of the impurities have been removed. Accordingly, a heat transfer agent which might cool or heat the initial part of the regeneration properly would not be proper for the final part. However, in my preferred practice proper temperature control is afforded throughout. A further advantage in this preferred practice results from the complicated apparatus structures which are required for carrying out my process. Such structures involve an exposure of large amounts of heat-conducting walls. When two widely different temperatures are maintained on different sides of these walls thermal expansion difficulties arise, causing buckling, etc. However, when substantially the same temperature is maintained throughout the apparatus, the apparatus operates without strain or difficulty.

In my copending application S. N. 270,942, filed April 29, 1939, I have disclosed and claimed an apparatus particularly suited for carrying out my present process. This apparatus is shown in the accompanying drawing wherein:

Fig. 1 is a side elevation partly in section showing the complete preferred apparatus;

Fig. 2 is a plan view taken on the line 2—2 of Fig. 1;

Fig. 3 is a detailed view of a return bend in the tubes employed in the burner shown in Fig. 1; and Fig. 4 is a plan view of a modified form which uses a plurality of tube bundles.

Referring to the drawing, the apparatus shown therein comprises a vertical chamber 1 filled with a liquid heat exchange medium. A tube bundle composed of a plurality of tubes 2—7 (see Fig. 2), of relatively small cross-section connected in series is submerged in said liquid heat exchange medium in such manner that each tube is surrounded by the liquid. Tubes 2—7 are mounted around a central passage 8 which has both of its ends open to the interior of the chamber and thus permits circulation of the heat exchange medium. Circulation of the heat exchange medium up through passage 8 and down around tubes 2—7 is effected by means of ejector impeller located just above the top opening of passage 8. The shaft of the impeller 9 extends up through the top cover plate of chamber 1 and is rotated by suitable means (not shown). Thermocouples 10 are located in the bottom return bends (See Fig. 3) of the serially connected tubes. Thermocouples 11 and 12 are provided in the bottom and top of the heat exchange medium, respectively.

A charging line 13 and a withdrawal line 14 are connected to the inlet and outlet of the tube bundle, respectively. Gaseous medium inlet line 15 is connected to charging line 13 through flow meter 16. A feed tank 17 for the finely divided solids to be treated, which is filled through hopper 18, is positioned above charging line 13 and connected thereto by line 19 at a point between flow meter 16 and the burner chamber 1. A pressure-stabilizing line 20 is provided for equalizing the pressure in feed tank 17 and charging line 13. Withdrawal line 14 empties into a suitable means for separating out the solids such as cyclone separator 21. The liquid heat exchange medium may be heated by suitable heating means (not shown) located outside chamber 1, such as electrical heaters, and may be cooled by suitable means (not shown) such as coils similarly located. Preferably chamber 1 is provided with insulation to prevent loss of heat from the chamber to the surroundings.

In case it is desired to increase the capacity of the burner this may be done, for instance, as shown in Fig. 4 by employing a larger chamber and submerging additional tube bundles. In such a case it is desirable to use a plurality of separate tube bundles rather than one long tube in order that proper contact time for the clay or other solids may be afforded while moving at minimum velocity. Likewise, various other modifications may be made in the specific embodiment described without departing from the scope of the invention. For instance, chamber 1 might be placed at various angles or even horizontally rather than vertically. Moreover, if desired, the heat exchange medium might be circulated by being withdrawn from the top of chamber 1, passed through suitable heating or cooling means, if necessary, and passed back into chamber 1 at the bottom. Air is the usual gaseous reactant passed into charging line 13 from line 15; however, if it is desired to pass in other gases in place of or in addition to the air, this may be done by injecting all through line 15, or separate lines may be provided. Furthermore, various other obvious channel means for passage of the clay through chamber 1 in place of the tube bundle shown might be used, the essential requirement being that all particles of the clay passing therethrough would be in sufficiently close proximity to the liquid heat exchange medium. If it were so desired, the clay might be passed through the space in the chamber and the liquid heat exchange medium through the tube bundle by suitable placing of the tubes so that each portion of the space in chamber 1 was in sufficiently close proximity to one of the tubes.

In operating the apparatus shown, the finely divided solids gravitate from feed tank 17 into charging line 13. A continuous stream of air and/or other gases pass from line 15 through line 13 where the solids are picked up and carried in suspension through the tube bundle in chamber 1 and out to cyclone separator 21. The gases react with the solids while passing through the tube bundle and the reaction temperature is uniformly controlled throughout the entire length of the tube bundle by adding heat to or by removing heat from the liquid heat exchange medium in chamber 1. In case a combustible material such as bonechar is being regenerated, it would be sent through the apparatus suspended in an inert gas, and heat alone would regenerate by destructively distilling the impurities.

As indicated hereinabove, the tubes through which the clay is passed should be of relatively small cross-section. The reason for this is the necessity to keep the particles near the center of the tubes in close proximity to the heat exchange medium as well as the particles near the walls of the tubes. This distance may vary with the materials treated, the atmosphere in the tubes, the reaction being carried out, the amount of carbonaceous material on the clay, mass velocity of the air, etc. Accordingly, it would be difficult to specify the greatest distance that may be used for every operation to which the apparatus may be put. However, in general, the diameter of the tubes should not exceed about 4 inches in order to afford proper temperature control, or put another way, no particle of clay should be removed more than about 2 inches from the heat exchange medium while in the burning zone. In the regeneration of petroleum filter clay I have found a maximum distance of 1½ inches to be highly satisfactory.

With this general guide and the concept that the clay is to be passed through a burner of substantial length to afford proper contact time with each particle in sufficiently close proximity to the heat exchange medium that no deleterious temperature will be created at any point, it is believed any worker in the art will have little trouble in designing the particular apparatus for his uses which incorporates the present invention. As pointed out hereinabove, there may be variations from the tube design shown while still making use of the present invention; nevertheless the above principles are the same. It might also be mentioned that in general for clay regeneration I have found it preferable to afford at least ½ cubic inch of liquid heat exchange medium for each cubic inch of burner space. While the specific values given herein apply principally to a design for regenerating clay, it is to be understood that if the operation being carried out is substantially different, appropriate changes may be made.

A typical commercial burner made according to my invention for regenerating clay at a throughput rate of around 11 tons of clay per hour might comprise a chamber of 200 cubic feet volume and a tube volume of 83 cubic feet. Such a burner would be furnished by a chamber 4 feet in diameter and 25 feet deep in which are submerged 20 bundles of tubes, each bundle consisting of 8 standard 2-inch pipes 22 feet in length.

In operating according to my method I have varied the rate of clay throughput over wide ranges without any detectable difference between the attendant degree of reactivation efficiency. It is desirable to run the air at the minimum velocity required to properly carry the solids in order to give the maximum contact time in the treating zone. Since the clays usually carry from 5 per cent to 15 per cent by weight of moisture, the contact time is proportionately reduced because of the vapor velocity of the water vapor produced. In some cases it may be found preferable to feed the clay at a very high rate and recirculate the clay through the burner one or two times. By this latter method of operation high over-all throughputs can be maintained.

If the air rate is insufficient to freely float the clay, the clay deposits in the up-going tubes until the air pressure builds up sufficiently to blow the tubes free of clay. Although such operation avoids the necessity of recirculating the clay, because of increased time of contact, it has the disadvantage of requiring an air supply at a higher pressure than that normally required. This pressure is about 10 pounds per square inch, for regular 30–60 mesh fuller's earth percolation clay, whereas for operations in which the clay floats freely within the tubes the pressure drop usually does not exceed about 5 pounds per square inch, being dependent only on the air rate, the clay rate, and the moisture content of the clay.

The optimum contact time varies somewhat with the temperature employed. For instance in regenerating clay with the liquid heat exchange medium at 1000° F., a contact time of from 15 to 30 seconds is required while for a heat exchange medium temperature of 1050° F., a contact time of 5 to 15 seconds is sufficient.

The superiority of the present apparatus over the commonly used burners and the establishment of the fact that it permits a temperature control not attainable by such prior burners, is believed best shown by the following tabular data showing comparative figures on the percent reactivity obtainable by regenerating percolation filter clay.

Table I

| Clay No. | Present apparatus | Conventional wedge multiple hearth burner |
|---|---|---|
| | Percent | Percent |
| F. B. | 100 | 100 |
| 2 | 94 | 76 |
| 5 | 81 | 66 |

Under "Clay No." the "F. B." indicates "Fresh burned" and is considered as 100% efficient. The numbers 2 and 5 indicate number of burnings and their decolorizing efficiencies are based on the fresh burned as 100%. Thus it may be seen that after two burnings the clay regenerated in my apparatus has a decolorizing efficiency of 94% (compared to fresh burned as 100%) and the clay regenerated in a conventional apparatus has dropped to 76% efficiency. After five burnings clay regenerated in my apparatus has an 81% efficiency while the conventionally burned clay has dropped to 66% efficiency. It is to be noted my No. 5 clay has a higher efficiency than even conventional No. 2 clay.

The importance of the liquid heat exchange medium for controlling the temperature of the clay may be further stressed by reciting some of my earliest experiments. In these early experiments I had attempted to regenerate spent clay by blowing same through a tube suspended in air without providing a liquid heat exchange medium. All such attempts failed to give results which approached the efficiency of even that of the conventional multiple hearth burners. In one such attempt I employed a standard 3 inch iron pipe 15 feet in length, held in a vertical position. Heat could be applied at three zones by means of ring gas burners. The pipe was insulated with 2 inches of pipe lagging. Preheated air picked up the clay to be treated and the air clay mixture was passed into the bottom of the pipe and collected at the top.

The following table gives the data of eleven runs carried out in the above manner:

Table II

| Run No. | Clay burned | Air rate | Inlet air | Temperature, °F. Combustible tube | | |
|---|---|---|---|---|---|---|
| | | | | Bottom | Center | Top |
| | | Cu. ft. per min. | | | | |
| 1 | Spent tonsil | 3.2 | 950 | 1525–1625 | | |
| 2 | ...do... | 5.5 | 950 | 1500–1600 | | |
| 3 | ...do... | 7.9 | 1200 | 1500–1600 | | |
| 4 | ...do... | 7.9 | 1100 | 1150–1200 | | |
| 5 | ...do... | 7.9 | 1200 | 1150–1250 | 1080–1150 | 820–850 |
| 6 | ...do... | 3.9 | 1000 | 1530–1610 | 1050 | 750–790 |
| 7 | ...do... | 5.5 | 80 | 1715–1830 | 650–1050 | 300–450 |
| 8 | ...do... | 5.5 | 80 | 1815–1840 | 980–1190 | 550–670 |
| 10 | Product of run 8. | 5.5 | 80 | 1600–1780 | 1175–1225 | 750–775 |
| 11 | Product of run 10. | 5.5 | 80 | 1545–1720 | 1225–1250 | 790–800 |

As can be seen from the data, it was impossible to control the temperature in the combustion tube. When the air clay ratio was so adjusted that a flame would be supported, the temperature in the combustion tube continued to rise even above 1800° F. If the air clay ratio was not such as would support a flame, the combustion column continued to cool until no burning took place. In no run was there commercially feasible reactivation of the clay.

In addition to the important advantage of positive temperature control whereby clay is reactivated to higher efficiency than that obtained in present methods as set forth above, the present method has several other distinct advantages over conventional methods. Not the least of these advantages is the fact higher throughput of clay per unit volume of burner is possible. In certain cases the throughput is 50 to 75 times that of present multiple hearth burners. Quite obviously a distinct improvement is afforded by this increased throughput rate in substantially reducing the time required to regenerate large batches of clay. The following tabular data clearly demonstrates the advantage on clays of similar carbonaceous content.

| Clay No. | Applicant's burner | | Wedge type burner | |
|---|---|---|---|---|
| | Clay feed rates | Efficiency | Clay rates | Efficiency |
| | Lbs./cu. ft./hr. | | Lbs./cu. ft./hr. | |
| F. B. | 59.0 | 100 | 1.2 | 100 |
| 2 | 59.0 | 94 | 1.2 | 76 |
| 5 | 59.0 | 81 | 1.2 | 66 |

A further advantage of the present method is the fact that it may be carried out in a burner comprising no moving parts except the pump for circulating the heat exchange medium. This not only makes construction and operation of the apparatus much simpler but considerably reduces the expense as compared, for example, to the commonly used multiple hearth burners wherein the rabble arms are rotated.

Another important feature of the present invention is the efficient utilization of the heat developed in burning. Since more heat is developed by burning most clays than is required this excess heat is absorbed by the liquid heat exchange medium and may be utilized for other purposes by heating other materials through heat exchange with the liquid heat exchange medium and thereby also properly controlling its temperature. On the other hand the utilization of the heat developed by burning in the commonly used burners such as the Wedge type multiple hearth is so poor due to loss to surroundings, etc., that additional fuel is added, the cost of this additional fuel for one average size refinery may be as high as $20,000 per year. In the present process a further utilization of the heat developed may be made by inserting heat exchangers as, for instance, waste heat boilers in the withdrawal line from the treating zone to extract heat from the heated air-clay mixture passing therethrough.

I claim:

1. A method of regenerating spent particles of petroleum percolation clay and similar petroleum percolation filtering material by burning off the petroleum matter thereon with air which comprises flowing the particles suspended in a concurrently flowing stream of said air through a regenerating zone wherein the particles are regenerated and circulating a sufficient amount of a liquid heat exchange medium, maintained in a temperature range between the minimum combustion temperature for said petroleum matter and the maximum combustion temperature that does not cause substantial heat damage to the particles, within sufficiently close indirect heat exchange to all the particles in said zone that the particles are not over about two inches from said heat exchange medium so that the temperature of the particles is maintained within said temperature range.

2. A method of regenerating spent particles of petroleum decolorizing clay and similar petroleum decolorizing filtering material by burning off the petroleum matter thereon with air which comprises flowing the particles suspended in a concurrently flowing stream of said air through a regenerating zone wherein the particles are regenerated and circulating a sufficient amount of a molten salt heat exchange medium, maintained in a temperature range between the minimum combustion temperature for said petroleum matter and the maximum combustion temperature that does not cause substantial heat damage to the particles, within sufficiently close indirect heat exchange to all the particles in said zone that the particles are not over about 1½ inches from said heat exchange medium so that the temperature of the particles is maintained within said temperature range.

3. A method of regenerating spent adsorbent particles of contact material contaminated with combustible impurities by burning off the impurities with air which comprises flowing the particles suspended in a concurrently flowing stream of said air through a regenerating zone wherein the particles are regenerated and circulating a sufficient amount of a liquid heat exchange medium, maintained in a temperature range between the minimum combustion temperature for said impurities and the maximum combustion temperature that does not cause substantial heat damage to the particles, within sufficiently close indirect heat exchange to all the particles in said zone so that the temperature of the particles is maintained within said temperature range.

4. A method of increasing the activity of adsorbent particles of contact material such as clay and the like by treating the particles with a gaseous agent within a given elevated temperature range that is closely controlled which comprises flowing the particles suspended in a concurrently flowing stream of said gaseous agent through an activating zone wherein the particles are activated and circulating a sufficient amount of a liquid heat exchange medium, maintained within approximately said temperature range, within sufficiently close indirect heat exchange to all the particles in said zone that the particles are not over about two inches from said heat exchange medium so that the temperature of the particles is maintained within said temperature range.

5. A method of treating adsorbent particles of contact material such as clay and the like with a gaseous agent within a given elevated temperature range that is closely controlled which comprises flowing the particles suspended in a concurrently flowing stream of said gaseous agent through a treating zone wherein the particles undergo said treatment and circulating a sufficient amount of a liquid heat exchange medium, maintained within approximately said temperature range, within sufficiently close indirect heat exchange to all the particles in said zone so that the temperature of the particles is maintained within said temperature range.

6. A method of regenerating spent adsorbent particles of contact material contaminated with combustible impurities by burning off the impurities with air which comprises flowing the particles suspended in a concurrently flowing stream of said air through a regenerating zone wherein the particles are regenerated and circulating a sufficient amount of a properly temperature-controlled liquid heat exchange medium within sufficiently close indirect heat exchange to all the particles in said zone so that the temperature of the particles is maintained in a temperature range between the minimum combustion temperature for said impurities and the maximum combustion temperature that does not cause substantial heat damage to the particles.

7. A method of treating solid particles with a gaseous agent within a given elevated temperature range that is closely controlled which comprises flowing the particles suspended in a concurrently flowing stream of said gaseous agent through a treating zone wherein the particles undergo said treatment and circulating a sufficient amount of a liquid heat exchange medium, maintained within approximately said temperature range, within sufficiently close indirect heat exchange to all the particles in said zone that the particles are not over about two inches from said heat exchange medium so that the temperature of the particles is maintained within said temperature range.

8. A method of reacting solid particles with a gaseous agent within a given elevated temperature range that is closely controlled which comprises flowing the particles suspended in a concurrently flowing stream of said gaseous agent through a reacting zone wherein the particles undergo said reaction and circulating a sufficient amount of a liquid heat exchange medium, maintained within approximately said temperature range, within sufficiently close indirect heat exchange to all the particles in said zone so that the temperature of the particles is maintained within said temperature range.

9. A method of increasing the activity of adsorbent contact particles carrying petroleum matter by treating the particles with a combustion-supporting gaseous agent within a given elevated temperature range that is closely controlled which comprises flowing the particles suspended in a concurrently flowing stream of said gaseous agent through a treating zone wherein the particles undergo said treatment and, circulating a sufficient amount of a liquid heat exchange medium within sufficiently close indirect heat exchange to all the particles in said zone so that the temperature of the particles is maintained in a temperature range between the minimum combustion temperature for said petroleum matter and the maximum combustion temperature that does not cause substantial heat damage to the particles.

JOHN W. PAYNE.